(12) United States Patent  
Downey

(10) Patent No.: US 6,378,928 B1  
(45) Date of Patent: Apr. 30, 2002

(54) PIVOTING ACTUATOR FOR SEAT TRACK ASSEMBLY

(75) Inventor: Hugh D. Downey, Barrie (CA)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 09/658,173

(22) Filed: Sep. 8, 2000

Related U.S. Application Data

(60) Provisional application No. 60/152,733, filed on Sep. 8, 1999.

(51) Int. Cl.[7] .................................................. B60N 2/02
(52) U.S. Cl. ............................... 296/65.13; 296/65.01; 248/429
(58) Field of Search ........................... 296/65.01, 65.13, 296/65.14; 248/424, 429, 430

(56) References Cited

U.S. PATENT DOCUMENTS

| | | | | |
|---|---|---|---|---|
| 3,866,876 A | * | 2/1975 | Adams ........................ 248/429 |
| 4,961,559 A | * | 10/1990 | Raymor ...................... 248/429 |
| 5,275,370 A | * | 1/1994 | Terai .......................... 248/429 |
| 5,286,076 A | * | 2/1994 | DeVoss et al. ............. 296/65.1 |
| 5,727,768 A | | 3/1998 | Sakamoto |
| 6,007,039 A | | 12/1999 | Olsson et al. |
| 6,010,190 A | | 1/2000 | Downey |
| 6,021,990 A | | 2/2000 | Freund |
| 6,036,253 A | | 3/2000 | Garrido |
| 6,036,267 A | | 3/2000 | Downey et al. |
| 6,036,157 A | | 5/2000 | Baroin et al. |
| 6,082,805 A | | 7/2000 | Gray et al. |
| 6,089,521 A | * | 7/2000 | Tarusawa et al. ........... 248/430 |
| 6,089,665 A | | 7/2000 | Andrigo |
| 6,092,873 A | | 7/2000 | Downey et al. |
| 6,095,475 A | | 8/2000 | Willms et al. |
| 6,109,584 A | * | 8/2000 | Garrido ...................... 248/429 |

* cited by examiner

Primary Examiner—Stephen T. Gordon  
Assistant Examiner—Lori L Coletta  
(74) Attorney, Agent, or Firm—C. R. Kiczek

(57) ABSTRACT

A seat track assembly comprises a first seat track and a second seat track slidable relative to the first seat track along a longitudinal axis. An actuator has a handle, at least one leg extending from the handle, and a distal end portion. The actuator is movable between a locked position where the distal end portion engages the first seat track to lock the second seat track with respect to the first seat track, and an unlocked position where deflection of the leg moves the distal end portion out of engagement with the first seat track. This allows sliding adjustment of the second seat track with respect to the first seat track. Each seat track may have openings which are coaxially aligned when the actuator is in the locked position. In certain preferred embodiments a fixed member biasing mechanism may be used to urge the actuator out of engagement with the first seat track. Also, in certain alternative preferred embodiments the actuator is a towel bar, the handle is perpendicular to legs and the distal end portions are perpendicular to the legs.

20 Claims, 4 Drawing Sheets

PIVOTING ACTUATOR FOR SEAT TRACK ASSEMBLY

This utility patent application claims the benefit of U.S. Provisional Application Ser. No. 60/152,733 filed Sep. 8, 1999.

FIELD OF THE INVENTION

The present invention is directed to seat track assemblies for motor vehicles, and more particularly to improvements in lock mechanisms for releasably holding the seat track assembly in a fixed position.

BACKGROUND OF THE INVENTION

Seat adjusters are often used in seat assemblies for selectively adjusting the position of a vehicle seat. Typically a first seat track is fixed to a vehicle structure, such as a floor, and a second seat track is supported on the first track for sliding movement relative to the first track member such that the seat position can be adjusted forwardly or rearwardly with respect to the vehicle. In conventional motor vehicle seats, normally at least two fixed tracks, spaced apart from one another, are used, with each fixed track receiving a corresponding sliding track. The adjustment of the seat assembly is controlled by a mechanical actuator, an electrical actuator, or an electromechanical actuator.

Manual seat adjusters often provide horizontal seat adjustment through the use of a towel bar or other release handle which engages a latch. The towel bar typically has a handle portion which is located at the front of the seat, directly below a seat bottom cushion. The towel bar is typically pivoted on a pivot member affixed to the sliding seat track and located behind the handle portion. The pivot member can be a pin, a tab, or a rivet. Typically the latch has teeth which engage windows in the fixed track or vice versa, such that the latch has windows which engage teeth on the track. When an operator pulls up on the towel bar, the latch is urged out of engagement with the fixed tracks, permitting comfort adjustment.

While such towel bar and latch designs are common today, they can have problems with noise, complexity of parts and overall cost. It would be desirable to have a seat adjustment assembly with a towel bar mounting configuration that, reduces noise, and improves seat robustness at reduced cost.

In view of the foregoing, it is an object of the present invention to provide a seat track assembly which is of simple construction and low cost, and which eliminates the need for a separate pivot member and separate latch. It is an additional object of the present invention to provide a seat track assembly that is highly reliable in operation and which can be manufactured efficiently. Additional objects and optional features of the invention will be apparent from the following disclosure and detailed discussion of preferred embodiments.

SUMMARY OF THE INVENTION

In accordance with a first aspect seat track assembly for mounting a seat within a vehicle comprises a first seat track and a second seat track slidable relative to the first seat track along a longitudinal axis, and an actuator comprising a central handle, at least one leg extending from the central handle, and a distal end portion. The actuator is movable between a locked position where the distal end portion engages the first seat track to lock the second seat track with respect to the first seat track, and an unlocked position where deflection of the leg moves the distal end portion out of engagement with the first seat track, thereby allowing sliding adjustment of the second seat track with respect to the first seat track.

In accordance with another aspect of the invention, a towel bar has a central handle, the leg extends generally perpendicular from the central handle, and a distal end portion extending generally perpendicular from the leg. The towel bar is movable between a locked position where the distal end portion engages the first seat track to lock the second seat track with respect to the first seat track, and an unlocked position where the distal end portion moves out of engagement with the first seat track.

In accordance with another aspect of the invention, the first seat track has at least one first opening and the second seat track has a second opening. The actuator is movable in the second opening between a locked position wherein the actuator engages the first opening to lock the second seat track with respect to the first seat track, and an unlocked position where the actuator is disengaged from the first opening, and the first opening and the second opening are coaxially aligned when the actuator is in the locked position.

In accordance with another aspect of the invention, a biasing mechanism is a fixed member which biases the actuator out of engagement with the first seat track as the actuator moves from the locked position to the unlocked position.

From the foregoing disclosure and the following more detailed description of various preferred embodiments, it will be apparent to those skilled in the art that the present invention provides a significant advance in the technology and art of seat track assemblies. Particularly significant in this regard is the potential the invention affords for providing a low cost, elegant design for securing the sliding track over the lower track of a motor vehicle and satisfying high strength requirements. Additional features and advantages of various preferred embodiments will be better understood in view of the detailed description provided below.

Figure 1:
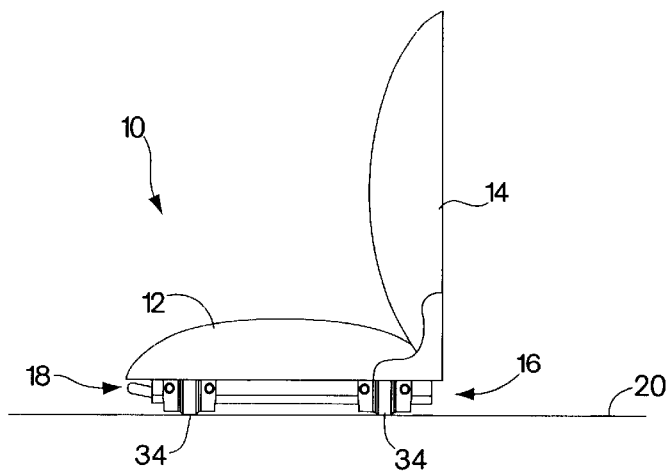
FIG. 1 is a side schematic view of a seat having a seat track assembly.

It should be understood that the appended drawings are not necessarily to scale, presenting a somewhat simplified representation of various preferred features illustrative of the basic principles of the invention. The specific design features of the seat track assembly as disclosed here, including, for example, specific dimensions of the actuator and the openings will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the seat track assembly illustrated in the drawings. In general, forward direction refers to the left side of the paper in FIG. 1, rearward direction refers to the right side of the paper in FIG. 1, up or upward refers to the top of the paper in FIG. 1, and down or downward refers to a direction towards the bottom of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the seat track assemblies disclosed here. The following detailed discussion of various alternative and preferred features and embodiments will illustrate the general principles of the invention with reference to a seat track assembly of a motor vehicle capable of two-way adjustment. Other embodiments suitable for other applications, including four-way, all-belts-to-seat (ABTS) and memory embodiments will be apparent to those skilled in the art given the benefit of this disclosure.

Turning now to the drawings, FIG. 1 shows a side schematic view of a vehicle seat assembly 10 comprising a seat bottom 12 and a seat back 14 supported with respect to the seat bottom 12. A seat track assembly 16 is used to mount the seat assembly 10 to a vehicle structure 20, such as a floor. An actuator 18 is used to adjust the position of the seat 10 in at least forward and rearward directions. The actuator 18 is preferably a towel bar 22, shown more clearly in FIG. 2, that is pivoted between a locked and an unlocked position.

The seat track assembly 16 comprises an inboard seat track assembly 30 and an outboard seat track assembly 32 connected by the actuator 18, as described in greater detail below. Except where specifically indicated, each of the inboard and outboard seat track assemblies are essentially identical to one another, having a first track 24 that is mounted to the vehicle structure 20 and a second track 26 that is slidably adjustable with respect to the first track 24 (See FIG. 2). The tracks 24, 26 define a longitudinal axis 28. The second track 26 is adjustable with respect to the first track 24 along the longitudinal axis 28.

The seat bottom 12 is supported on the second tracks 26 for movement with the second tracks 26 for horizontal seat adjustment, i.e., between forward and rearward positions in the vehicle. Preferably, the first tracks 24 are mounted to the vehicle floor and each of the second tracks 26 slides along a corresponding first track 24 when the actuator is in an unlocked position. When the actuator 18 is in a locked position, the second seat tracks 26 are locked to their corresponding fixed seat tracks 24.

Figure 2:
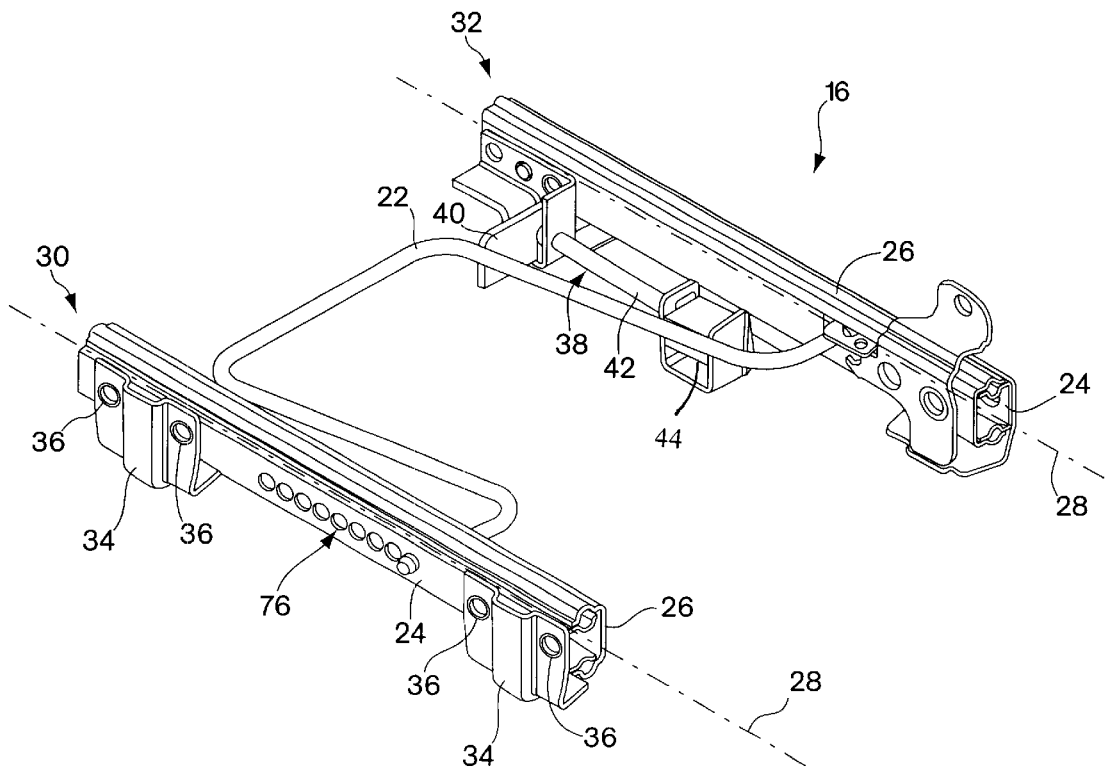
FIG. 2 is a perspective view of a seat track and locking assembly incorporating the inventive actuator configuration in accordance with a preferred embodiment.

The actuator 18 is shown as a towel bar 22 which is used by a seat occupant for selectively providing input to the mounting assembly 16 to control the movement of the second track 26 with respect to the first track 24. More specifically, as shown in FIG. 2, the towel bar 22 is preferably comprised of a single piece tubular member that is operably connected to both the inboard 30 and outboard 32 track assemblies, however a rotary handle or cable actuation could also be used. For example, a rotary handle could be operably connected to the outboard track assembly 32 and a slave mechanism could be extended to the inboard track assembly 30 to allow sliding movement between the tracks 24, 26. Other mechanisms useful as an actuator will be readily apparent to those skilled in the art given the benefit of this disclosure.

Brackets 34 (seen in FIGS. 1 and 2) are used to mount the first track 24 to the vehicle floor 20 on both the inboard 30 and outboard 32 sides. Rivets 36 or other fasteners well known in the art are use to mount the first track 24 to the brackets 34.

When the seat track assembly is locked, the towel bar 22 is received in an opening 46 formed in an elongate face 68 of the slidable tracks, and in one of a series of openings 76 formed in an elongate face 69 of the fixed tracks. That is, one of the openings 76 is coaxially aligned with opening 46 so that both openings 46, 76 receive the towel bar 22. As discussed in greater detail below, when the towel bar is lifted up, the towel bar disengages the first, fixed tracks, permitting comfort adjustment of the second tracks 26 with respect to the fixed tracks 24. In this way, the towel bar advantageous acts as not only a handle portion for an operator, but also as a latch mechanism directly and releasably securing the sliding tracks to the fixed tracks.

A biasing mechanism, shown generally in FIG. 2 at 38, urges the actuator 18 to move between a locked position and an unlocked position. The biasing mechanism 38 of this preferred embodiment is comprised of a spindle lock having a biasing bracket 40 that is engaged and disengaged from a drive spindle 42 by the towel bar 22. When the bracket 40 is disengaged from the spindle 42, the spindle 42 can rotate with respect to a drive nut 44, fixed to the first track 24, to allow horizontal adjustment. When the bracket 40 is engaged with the spindle 42, the spindle 42 is prohibited from rotating and horizontal adjustment is prohibited.

Figure 3:
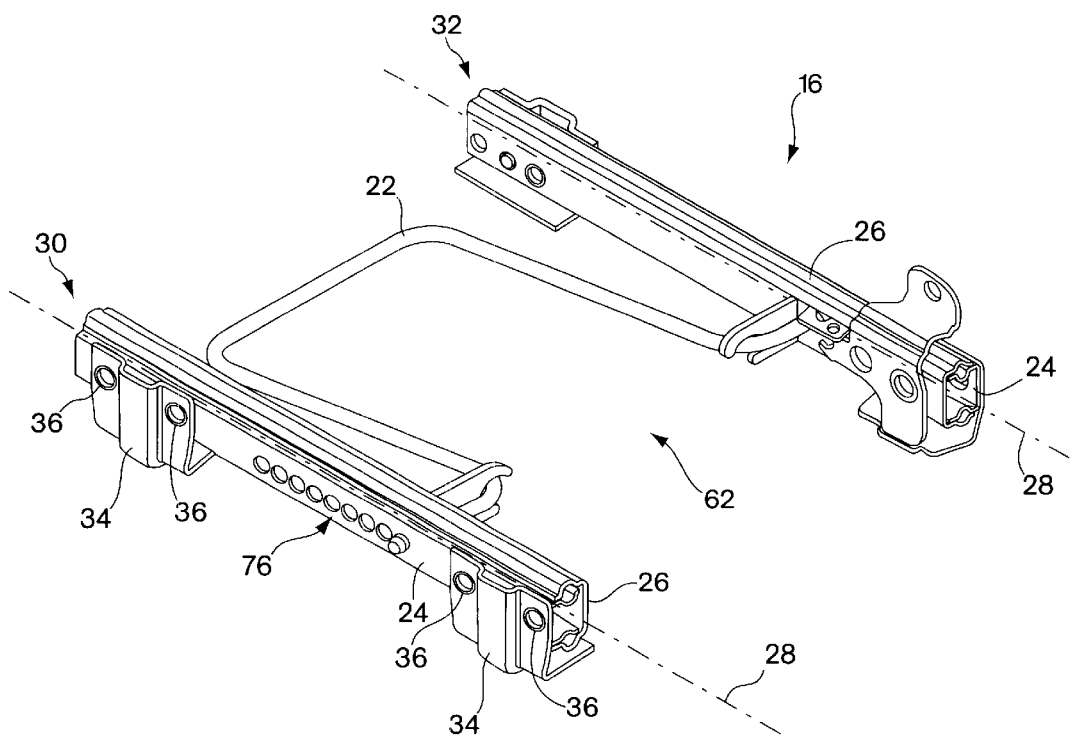
FIG. 3 is a perspective view of the seat track assembly showing an alternative embodiment where the lock assembly is formed as a fixed bias mechanism.
Figure 4:
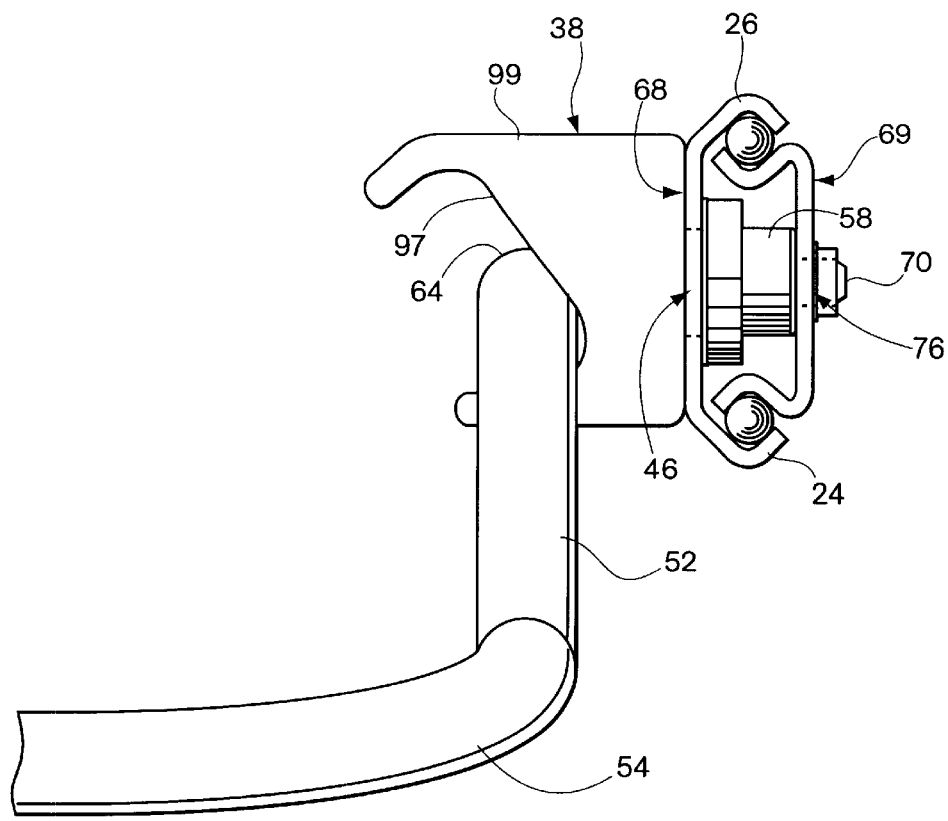
FIG. 4 is an end view of the seat track assembly of FIG. 3 focusing on the bias mechanism showing the actuator in a locked position.
Figure 5:
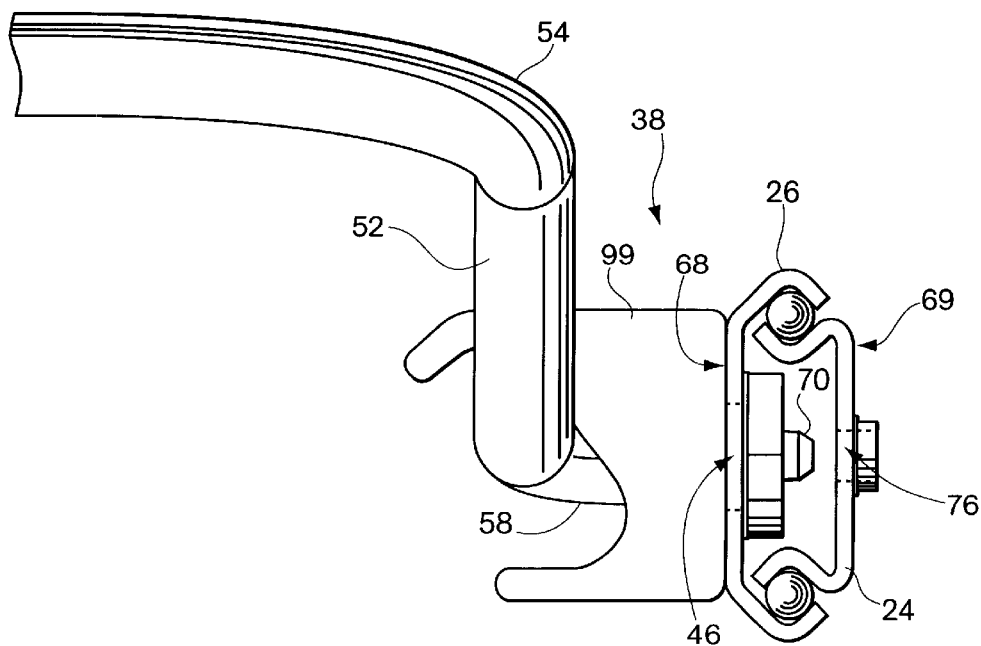
FIG. 5 is an end view of the seat track assembly of FIG. 3 showing the actuator in an unlocked position, disengaged from the first, fixed track.

FIG. 3 shows an alternative preferred embodiment where the biasing mechanism 38 is a fixed member such as a block 99 having a ramped surface 97, attached to the second seat tracks 26. The term fixed member, as used here, means that block 99 does not deform or deflect significantly as the seat track assembly is cycled. FIGS. 4 and 5 show a side view of the embodiment of FIG. 3, showing the towel bar in the locked position in FIG. 4 and the unlocked position in FIG. 5. The actuator 18 is a towel bar 22 having a central handle portion 54 and legs 52 extending from the central handle portion in a conventional manner. In accordance with a highly advantageous feature, the towel bar 22 also has distal end portions 58 extending from the corresponding leg. In the locked position, the distal end portions 58 extend through each corresponding opening 46 in the second track and into engagement with the first track 24 at one of the openings 76. As the towel bar is moved from the locked position to the unlocked position, leg 52 is biased along the ramped surface 97 away from the seat tracks. This forces the distal end portion 58 out of opening 76. In this condition, the second track 26 is free to slide with respect to the first track 24. Since the towel bar is under some pressure at this point, the towel bar is naturally biased toward the locked position.

Figure 6:
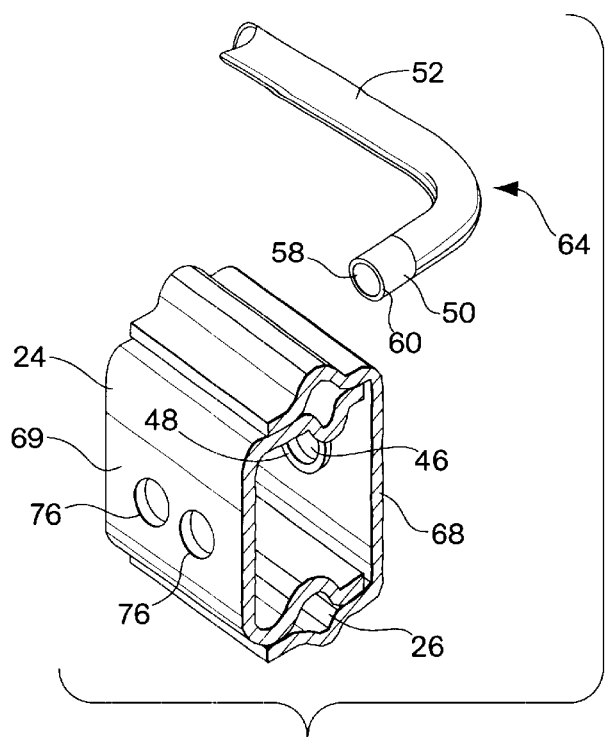
FIG. 6 is an exploded view, partially cut-away, of one side of the seat track assembly and actuator.

The unique interface between the actuator 18 and the tracks 24, 26 is shown in an exploded perspective view in FIG. 6. The second track 26 includes an opening 46 that defines a bearing surface 48. The towel bar 22 extends into the opening 46 and presents another bearing surface 50 that rotatably engages the bearing surface 48 as the towel bar 22 is moved between the locked and unlocked positions.

As discussed above, the actuator 18 is a towel bar 22 that has a pair of legs 52 extending along the first 24 and second 26 tracks, generally parallel to the longitudinal axis 28. The legs 52 are interconnected by a central handle portion 54. The central handle portion 54 defines a horizontal axis 56 that is transverse to the longitudinal axis 28. Each of the legs 52 terminates at a distal end portion 58 that curves toward the second track 26.

As seen in FIG. 6, bearing surface 48 is presented about the periphery of the opening 46 in the second track 26 an bearing surface 50 is defined by an exterior surface 60 of the distal end portion 58. The opening 46 is a generally circular aperture that defines a center that is concentric with the distal end portion 58. The opening 46 of the second track is an extruded opening extending inwardly toward the first track 24 to define an internal annular bearing surface as bearing surface 48. Bearing surfaces 48 and 50 form a pivot for actuator 18 as the actuator 18 is moved by the biasing assembly 38 between the locked and unlocked positions. The pivot comprises a frictional engagement between bearing surfaces 48 and 50 as the actuator 18 is moved between the locked and unlocked positions. The distal end portion 58 of the actuator 18 extends through opening 46 and into opening 76 in the first track 24, thereby resisting forward and rearward relative motion between the slidable track 26 and the fixed track 24. The bearing surface on opening 76 can be constructed in a manner analogous to the bearing surface 48 on opening 46.

As shown in FIGS. 2 and 3, the outboard track assembly 32 is spaced apart from the inboard track assembly 30 to define an interior space 62. The actuator 18 is partially received within the interior space 62. The actuator 18 is resiliently mounted directly to the second tracks 26 of the inboard 30 and outboard 32 track assemblies. Thus, to assemble the distal ends 58 of the towel bar 22 in the openings 46 of each of the second tracks 26, the legs 52 are pressed inwardly toward each other and then the ends 58 are inserted into the openings 46. Once inserted, the legs 52 try to extend outwardly to their original position. This resilient force provides a tight fit that eliminates looseness in the joint. The towel bar 22 can also have a curved radius portion 64 (seen in FIG. 6) between each leg 52 and the corresponding distal end 58 that further eliminates looseness. The tight fit also reduces noise and is more robust.

Figure 7:
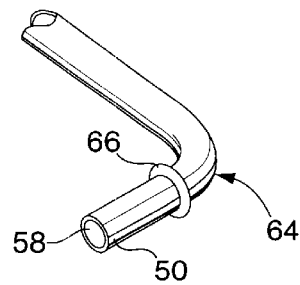
FIG. 7 is a first alternative embodiment of the distal end portion of the actuator.

An alternate embodiment of the distal end portion 58 is shown in FIG. 7. The distal end portion 58 can optionally include a flange 66 for engaging an external face 68 of the second track 26. The flange 66 helps to locate the towel bar 22 with respect to the second track 26 and provides a positive structural engagement for the resilient loading of the towel bar 22 when it is installed in the second tracks 26.

Figure 8:
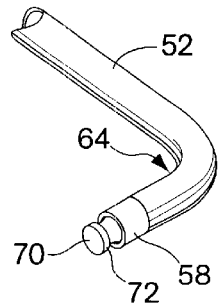
FIG. 8 is a second alternative embodiment of distal end portion of the actuator.

A second alternate embodiment of the distal end portion 58 is shown in FIG. 8. The distal end 58 in this embodiment includes a tip extension 70 that has a reduced diameter as compared to the diameter of the distal end portion 58. The second bearing surface 50 is defined as an exterior surface 72 of the tip extension 70. One advantage with this configuration is that less space is taken up by the tip extension 70 between the first 24 and second 26 seat track members. Also, the distance between openings 76 on the first track is a function of the diameter of the openings, and the distance between the openings 76 determines the increments of comfort adjustment. Generally it is desirable to have as fine an increment of adjustment as possible. Therefore, with this embodiment the diameter of the openings 76 can be reduced, reducing the increments of adjustment in turn.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly for mounting a seat within a vehicle comprising, in combination:

a first seat track mounted to a vehicle structure and defining a longitudinal axis;

a second seat track slidable relative to the first seat track along the longitudinal axis; and an actuator comprising a handle, at least one leg extending from the handle, and a distal end portion, wherein the actuator is movable between a locked position where the distal end portion engages the first seat track to lock the second seat track with respect to the first seat track, and an unlocked position where deflection of the leg moves the distal end portion out of engagement with the first seat track, thereby allowing sliding adjustment of the second seat track with respect to the first seat track.

2. The seat track assembly of claim 1 wherein the first seat track is provided with a plurality of openings, and each opening is sized to receive the distal end portion of the actuator when the actuator is in the locked position.

3. The seat track assembly of claim 1 further comprising a biasing mechanism for biasing the leg as the actuator moves between the locked position and the unlocked position.

4. The seat track assembly of claim 1 wherein the actuator is a towel bar and the distal end portion has a flange for engaging a face of the second seat track to locate the towel bar with respect to the second seat track.

5. The seat track assembly of claim 1 wherein the distal end portion has a diameter and further comprises a tip extension having a smaller diameter than the diameter of the distal end portion.

6. A seat track assembly for mounting a seat within a vehicle comprising, in combination:

a first seat track mounted to a vehicle structure, having at least one first opening and defining a longitudinal axis;

a second seat track slidable relative to the first seat track along the longitudinal axis and having a second opening; and an actuator movable in the second opening between a locked position wherein the actuator engages the first opening to lock the second seat track with respect to the first seat track, and an unlocked position where the actuator is disengaged from the first opening, thereby allowing sliding adjustment of the second seat track with respect to the first seat track;

wherein the first opening and the second opening are coaxially aligned when the actuator is in the locked position.

7. The seat track assembly of claim 6 wherein the actuator has a first bearing surface and the second opening defines a second bearing surface, and the first bearing surface engages the second bearing surface as the actuator is moved between the actuated and unactuated positions.

8. The seat track assembly of claim 6 further comprising:

a seat bottom;

a seat back supported relative to the seat bottom;

an inboard track assembly and an outboard track assembly, spaced apart from the inboard track assembly to define an interior space, the inboard and outboard track assemblies supporting the seat bottom;

wherein the inboard track assembly comprises the first seat track and the second seat track, and the outboard track assembly comprises another first seat track fixed to a vehicle structure and spaced apart from the first seat track and another second seat track slidable over the another first seat track, the seat bottom is connected to the second seat track and the another second seat track for movement with the second seat track and the another second seat track relative to the first seat track and the another second seat track, and the actuator is operatively connected to both the second seat track and the another second seat track.

9. The seat track assembly of claim 8 wherein the first seat track has an elongate first face provided with a plurality of first openings, and the second seat track has an elongate second face where the second opening is on the second face.

10. The seat track assembly of claim 9 wherein the another second seat track has an elongate face which faces the elongate second face of the second seat track.

11. The seat track assembly of claim 8 wherein the actuator is pivotably mounted on the second seat track and the another second seat tracks.

12. A seat track assembly for mounting a seat within a vehicle comprising, in combination:

a first seat track mounted to a vehicle structure and defining a longitudinal axis;

a second seat track slidable relative to the first seat track along the longitudinal axis;

an actuator movable between a locked position wherein the actuator engages the first seat track to lock the second seat track with respect to the first seat track, and an unlocked position where the actuator is disengaged from the first seat track, thereby allowing sliding adjustment of the second seat track with respect to the first seat track; and a biasing mechanism biasing the actuator out of engagement with the first seat track as the actuator moves from the locked position to the unlocked position, wherein the biasing mechanism is a fixed member.

13. The seat track assembly of claim 12 wherein the actuator has a leg which abuts against a ramped surface on the biasing mechanism, and movement of the actuator toward the unlocked position urges the leg away from the first seat track.

14. The seat track assembly of claim 12 wherein the actuator has a leg and a distal end portion, wherein the distal end portion engages the first seat track when the actuator is in the locked position.

15. The seat track assembly of claim 14 wherein the distal end portion has a diameter and further comprises a tip extension having a smaller diameter than the diameter of the distal end portion.

16. The seat track assembly of claim 15 further comprising a plurality of first openings formed on the first seat track and sized to receive the tip extension;

a second opening formed on the second seat track and sized to receive the distal end portion of the actuator;

wherein the plurality of first openings have a diameter which is smaller than a diameter of the second opening.

17. A seat track assembly for mounting a seat within a vehicle comprising, in combination:

a first seat track mounted to a vehicle structure and defining a longitudinal axis;

a second seat track slidable relative to the first seat track along the longitudinal axis; and a towel bar comprising a central handle, at least one leg extending generally perpendicular from the central handle, and a distal end portion extending generally perpendicular from the at least one leg, wherein the towel bar is movable between a locked position where the distal end portion engages the first seat track to lock the second seat track with respect to the first seat track, and an unlocked position where the distal end portion moves out of engagement with the first seat track, thereby allowing sliding adjustment of the second seat track with respect to the first seat track.

18. The seat track assembly of claim 17 further comprising a first bearing surface defined by an exterior surface of the distal end portion and a second bearing surface defined by an opening in the second track, wherein the first engages the second bearing surface as the towel bar moves between the locked and unlocked positions.

19. The seat track assembly of claim 17 wherein the at least one leg temporarily deflects as the towel bar moves from the locked position to the unlocked position, urging the distal end of the towel bar out of engagement with the first seat track.

20. The seat track assembly of claim 17 further comprising:

a seat bottom;

a seat back supported relative to the seat bottom;

an inboard track assembly and an outboard track assembly, spaced apart from the inboard track assembly, the inboard and outboard track assemblies supporting the seat bottom;

wherein the towel bar operatively connects the inboard track assembly to the outboard track assembly.

* * * * *